United States Patent [19]

Henson et al.

[11] Patent Number: 5,537,645

[45] Date of Patent: Jul. 16, 1996

[54] FILE LOCK MANAGEMENT IN A DISTRIBUTED DATA PROCESSING SYSTEM

[75] Inventors: Larry W. Henson, Austin; Donavon W. Johnson, Georgetown, both of Tex.; Stephen P. Morgan, Mahopac, N.Y.; Todd A. Smith, Austin, Tex.

[73] Assignee: International Business Machines Corporation, Armonk, N.Y.

[21] Appl. No.: 345,020

[22] Filed: Nov. 23, 1994

Related U.S. Application Data

[63] Continuation of Ser. No. 86,964, Jul. 2, 1993, abandoned, which is a continuation of Ser. No. 893,959, Jun. 4, 1992, Pat. No. 5,226,159, which is a continuation of Ser. No. 352,080, May 15, 1989, abandoned.

[51] Int. Cl.⁶ .............................. G06F 13/00; G06F 12/16
[52] U.S. Cl. .............. 395/650; 395/200.01; 395/200.09; 364/DIG. 1; 364/246.8; 364/281.6; 364/282.4
[58] Field of Search .............................. 395/650, 200.01, 395/200.09

[56] References Cited

U.S. PATENT DOCUMENTS

| 4,435,766 | 3/1984 | Haber et al. | 364/300 |
| 4,574,350 | 3/1986 | Starr | 364/200 |
| 4,825,354 | 4/1989 | Agrawal et al. | 364/200 |
| 4,887,204 | 12/1989 | Johnson et al. | 364/200 |
| 4,891,749 | 1/1990 | Hoffman et al. | 364/200 |
| 4,901,231 | 2/1990 | Bishop et al. | 364/200 |
| 5,226,159 | 7/1993 | Henson et al. | 395/200 |

FOREIGN PATENT DOCUMENTS 0278312  1/1988  European Pat. Off. .

OTHER PUBLICATIONS

Software Eng. Journal, "A Distributed File Server for Embedded Applicatioin", vol. 3, No. 5, Sep. 1988, pp. 142–148.

IBM TDB "Data Concurrency Control in Distributed Data Networks", vol. 24, No. 7A, Dec. 1981, pp. 3137–3139.
S. R. Kleiman, "Vnodes An Architecture for Multiple File System Types in Sun UNIX", Conference Proceedings, USENIX 1986, pp. 238–247.
Russel Sandberg et al., " Design and Implementation of the Sun Network Filesystem", USENIX 1985, pp. 119 to 130.
Dan Walsh et al., "Overview of the Sun Network File System", pp. 117 to 124.
JoMei Chang, "Status Monitor Provides Network Locking Service for NFS", Sun Net, pp. 71–75.
Bradley Taylor, "Secure Networking in the Sun Environment", pp. 28 to 36.
Andrew P. Rifkeim et al. "RFS Architecture Overview", USENIX Conference (Jun. 1986) pp. 1 to 12.
Richard Hamilton et al., "An Administrator's View of Remote file Sharing", pp. 1 to 9.
Tom Mongenton et al. "File Systems Switch", pp. 1 to 2.
David J. Olander et al., "A Framework for Networking in Systems V", pp. 1 to 8.

Primary Examiner—Kevin A. Kriess
Assistant Examiner—Kakali Chaki
Attorney, Agent, or Firm—Douglas H. Lefeve

[57] ABSTRACT

A distributed data processing system and method in which locks on a file are supported by a data structure that resides on either a client machine or on the file's server. When only a single client's processes are locking a file, the data structure can reside on that client. Whenever a plurality of client machines attempt to place locks on a file, the data structure is moved to the server; this forces the clients locking the file to communicate with the server when performing lock operations. When a client requests a lock from the server that cannot be granted because of an existing blocking lock, the client is informed that it should put the requesting process asleep awaiting a retry notification. When there is a change in the locks on the file that might allow such a client's now sleeping process to acquire the lock, the server sends a retry notice to the client. This awakens the sleeping process at the client, and the process then reattempts the lock operation by sending a message to the server.

7 Claims, 4 Drawing Sheets

FILE LOCK MANAGEMENT IN A DISTRIBUTED DATA PROCESSING SYSTEM

CROSS-REFERENCE TO RELATED APPLICATIONS

This is a continuation of application Ser. No. 08/086,964 filed Jul. 2, 1993, now abandoned, which is a continuation of application Ser. No. 07/893,959 filed Jun. 4, 1992 (U.S. Pat. No. 5,226,159), which is a continuation of application Ser. No. 07/352,080 filed May 15, 1989 abandoned.

U.S. Pat. No. 4,887,204 of D. W. Johnson et al, filed Feb. 13, 1987, entitled "A System And Method for Accessing Remote Files In A Distributed Networking Environment", herein incorporated by reference.

U.S. Pat. No. 5,113,519 of D. W. Johnson et al, filed May 15, 1989, entitled "Maintenance Of File Attributes In A Distributed Data Processing System", herein incorporated by reference.

U.S. application Ser. No. 07/352,220, (continuation Ser. No. 07/898,234, filed Jun. 12, 1992), of S. P. Morgan et al, filed May 15, 1989, entitled "File Extension By Clients In A Distributed Data Processing System", herein incorporated by reference.

U.S. application Ser. No. 07/352,025 of D. W. Johnson et al, filed May 15, 1989, entitled "Remote Authentication And Authorization In A Distributed Data Processing System", herein incorporated by reference.

U.S. application Ser. No. 07/352,518, (continuation Ser. No. 07/751,603, filed Aug. 21, 1991), of L. K. Loucks et al, filed May 15, 1989, entitled "A Flexible Interface To Authentication Services In A Distributed Data Processing System", herein incorporated by reference.

U.S. Pat. No. 5,175,851 of D. W. Johnson et al, filed May 15, 1989, entitled "System and Method for Efficient Control of Cached Data in a Distributed Data Processing System", herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to processing systems connected through a network, and more particularly to the accessing of files between local and remote processing systems within the network.

BACKGROUND ART

As shown in FIG. 1, a distributed networking environment 1 consists of two or more nodes A, B, C, connected through a communication link or a network 3. The network 3 can be either a local area network (LAN), or a wide area network (WAN).

At any of the nodes A, B, C, there may be a processing system 10A, 10B, 10C, such as a workstation. Each of these processing systems 10A, 10B, 10C, may be a single user system or a multi-user system with the ability to use the network 3 to access files located at a remote node. For example, the processing system 10A at local node A is able to access the files 5B and 5C at the remote nodes B and C, respectively.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems. The distributed services system in which the invention is implemented is truly a distributed system supporting a wide variety of applications running at different nodes in the system which may access files located anywhere in the system.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system are known. For example, IBM's Distributed Services for the AIX operating system is disclosed in the aforementioned U.S. Pat. No. 4,887,204. In addition, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network Filesystem", *Conference Proceedings, Usenix* 1985, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

Some of the problems which are encountered in accessing data at remote nodes can be better understood by first examining how a prior art distributed data processing system uses files. As taught by U.S. Pat. No. 4,877,204, filed Feb. 13, 1987, files stored at a server node can be accessed by processes running on remote client nodes. In order to synchronize and coordinate the use of a file by multiple clients, locking facilities are provided that work in such a distributed data processing system. By locking a file a process indicates its intention to make use of the file. In practice there are various kinds of file locks, such as locks indicating a desire for exclusive access, locks indicating a desire for shared access, locks on portions of the file, and locks on the entire file. Because multiple clients may be using a single file, the data structures describing the locks that have been placed are kept at the server when there is the possibility that multiple clients actually will be using the file. In the case where it is clear that a single client is the only user of the file the data structure describing the locks can be kept at that client. In the prior art this determination of where this data structure is located is made based on the processes that have the file open. Before a lock can be placed on the file, a process must have their file open. Therefore, when all of the processes that have the file open are located at a single node, the data structure describing locks on that file is kept at that node.

A difficulty with this prior art approach results from the fact that this determination is based upon which processes have the file open. In situations in which a file is shared by multiple clients, the data structures describing the locks will always be kept at the server despite the fact that only one process at a time actually has an interest in locking the file. A further difficulty is introduced by the need to relocate the data structures describing the locks at the time a process at a different client opens the file. Due to resource limits at the server, it may be impossible to move the data structure back to the server at the time of this open. When this occurs, either locking information must be lost (a very undesirable alternative) or the open operation must be refused (a situation that few applications are prepared to deal with).

As taught by the prior art, requests for locks are sent to the server when the data structures describing the locks reside at the server. These requests are executed by a kernel at the server. A kernel process is a process which has access to the operating system's data including the data structures describing the locks. When a lock request cannot be granted due to conflicting locks already in place, most lock operations are designed to wait until the blocking locks are released and the requested lock can be put in place. The problem with the technique used by the prior art is that a kernel process (kprocs) must wait at the server until the blocking locks are released. Kprocs consume resources at the server and, consequently, are limited in number. By forcing a kernel process to be idle in the presence of blocking locks, the design is more susceptible to exhaustion of all available kprocs. In an application in which processes of several clients are accessing a shared file, if one process locks the file and then, due to user error or a software error, fails to unlock the file a large number of kprocs may be tied up indefinitely. In extreme circumstances all available kprocs might be occupied in this manner to the extent that the system would not be able to support any more remote operations.

It would, therefore, be of great benefit in a distributed data processing system to provide a system and method for locking remote files that does not locate the data structures describing the locks for a file based on the processes having the file open and, further, does not require kprocs to wait when there are blocking locks.

SUMMARY OF THE INVENTION

Accordingly, in a distributed data processing system, locks on a file are supported by a data structure that resides on either a client machine or on the file's server. When only a single client's processes are locking a file, the data structure can reside on that client. Whenever a plurality of client machines attempt to place locks on a file, the data structure is moved to the server; this forces the clients locking the file to communicate with the server when performing lock operations.

A lock operation performed at a client uses the file lock data structure when one exists at the client. No communication with the server is needed when the data structure is present in the client doing the locking. When the data structure is not at the client, the client sends its lock request to the server. Upon receiving the request, the file's server determines if the requested lock operation is the only one currently being applied to the file. If it is the only one, the server responds to the lock request message with a reply that indicates that the client can begin maintaining the locking information at its node. Later, if a second client sends a request for a lock on this file to the server, the server will revoke the data structure maintaining the first client's locks. The first client sends the data structure back to the server and subsequently performs locking operations by sending requests to the server (until such time that it is informed again by the server that it can beginning maintaining the lock information).

When a client requests a lock from the server that cannot be granted because of an existing blocking lock, the client is informed that it should put the requesting process asleep awaiting a retry notification. When there is a change in the locks on the file that might allow such a client's now sleeping process to acquire the lock, the server sends a retry notice to the client. This awakens the sleeping process at the client, and the process then reattempts the lock operation by sending a message to the server.

The foregoing and other objects, features, extensions, and advantages of the invention will be apparent from the following more particular description of preferred embodiments of the invention as illustrated in the accompanying drawings.

DESCRIPTION OF THE PREFERRED EMBODIMENT

Figure 1:
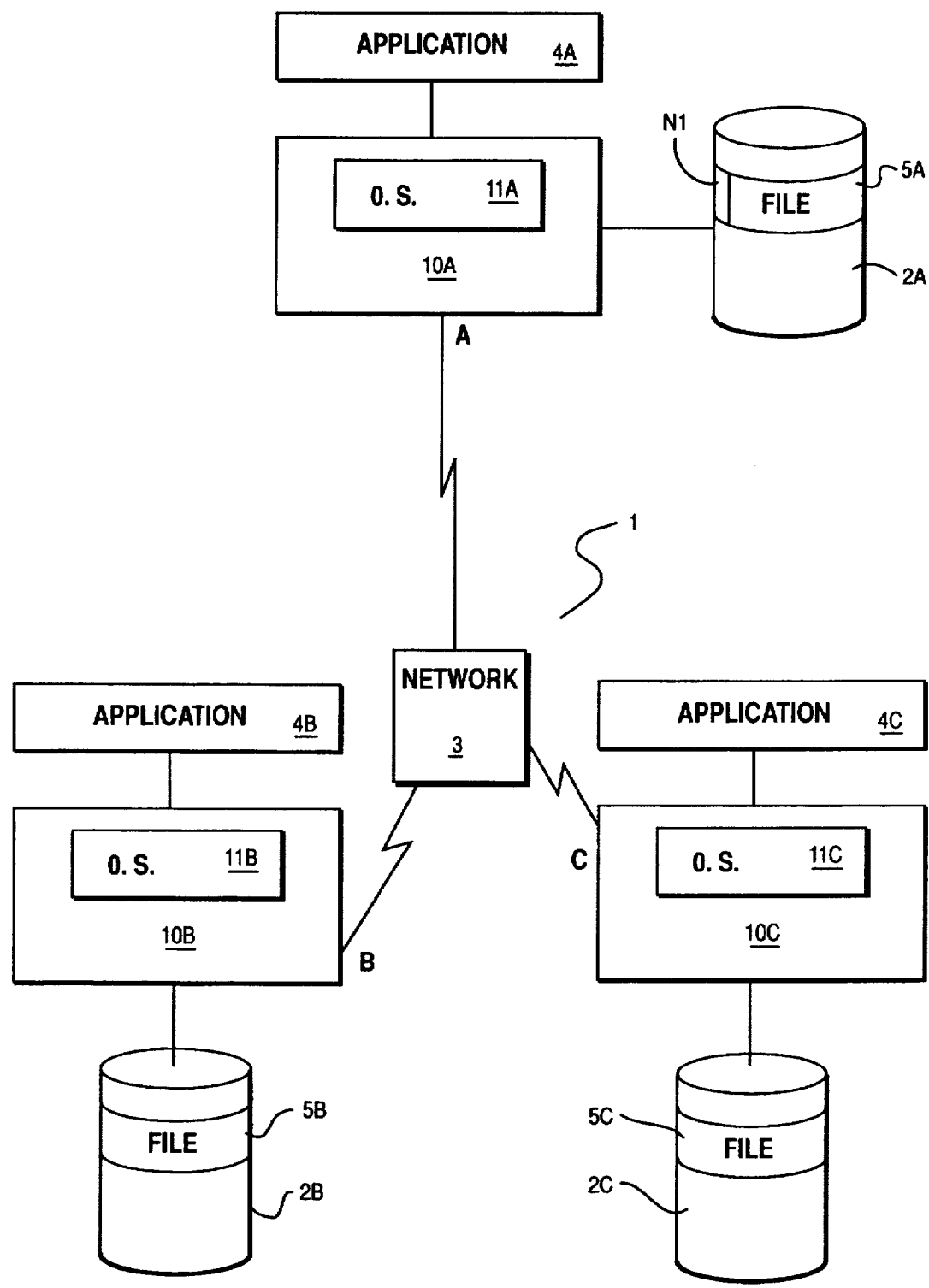
FIG. 1 is a block diagram of a distributed data processing system known in the art.

The invention is illustrated in the following scenario. With reference to the prior art network of FIG. 1, as enhanced by the improvement of this invention, client 10A sends a message to server 10C requesting that a lock be placed on File 5C, which is stored at server 10C. Server 10C replies to client 10A's request by indicating that there are no locks currently on the file and that client 10A should maintain the lock information at client 10A until revoked by the server. Subsequently, client 10B sends a lock request to server 10C for the same file. This causes the server 10C to send a revoke locks message to client 10A. In response, client 10A sends back to server 10C the lock information for the file. The server 10C may then discover that the lock request by client 10B cannot be granted, and that the process on client 10B will have to wait before acquiring the lock. Server 10C indicates this to client 10B in a reply that indicates a retry notification will be sent to client 10B when client 10A removes one of the blocking locks. It may be discovered when client 10B attempts to lock the file again that it is still blocked by a different lock or by the same lock which has been reapplied before client 10B performed its retry.

Figure 2:
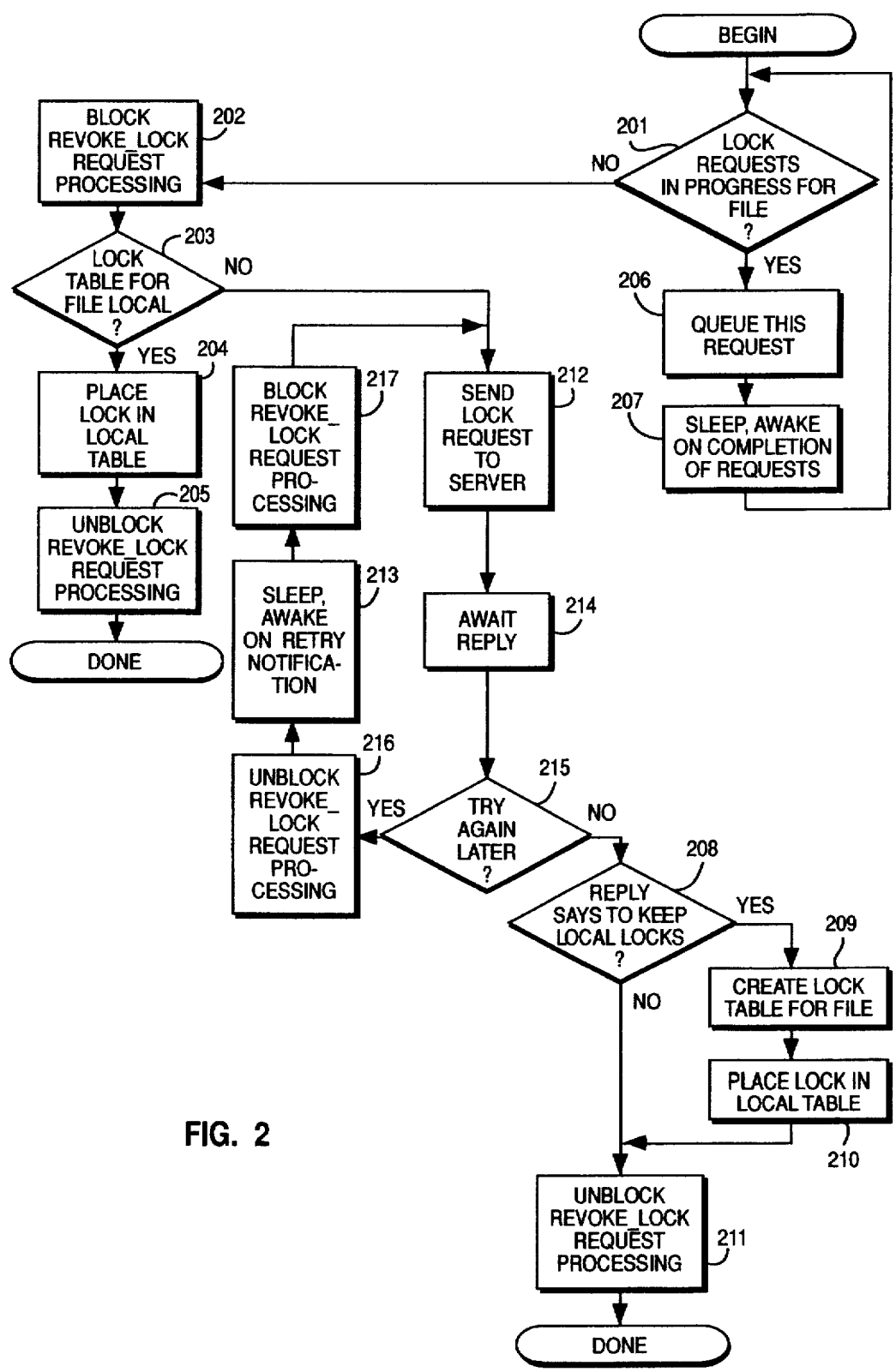
FIG. 2 is a flow chart which shows the processing that occurs at a client node when a process executing at that client attempts to perform a lock operation on a file.

FIG. 2 is a flow chart which shows the processing that occurs at a client node when a process executing at that client attempts to perform a lock operation on a file. Two particular problems are caused by the possibility that messages could be delayed by the communications mechanisms connecting the client to the server. These problems are handled by the processing described in FIG. 2.

This processing first makes sure that no other lock request are in progress for that file. By insuring that no other lock requests are in progress for this file no more than one lock request can be outstanding at a time for a single file. This is important because if a second lock request is sent to a server that had answered a first lock request before the answer to the first request had arrived at the client, a possible problem could occur. In this situation the server could have granted permission to the client to keep the data structures describing the lock on the file at that client in the answer to the first request. After informing the client to keep track of locking information in this manner, a server does not expect to be asked to satisfy a subsequent lock request. This undesirable situation could occur if a second lock request is issued by the client before the client receives the answer to the first. For this reason, lock processing at the client waits until any outstanding lock request for the file has been replied to before initiating a subsequent lock request for that file.

After insuring that there are no outstanding lock requests in progress lock processing then blocks the processing of any revoke lock requests for the file that may be received from the file's server. This is important in order to insure that the reply for the lock request which will be sent to the server is received before any revoke lock request is processed at the client that could refer to a lock granted in the reply. If revoke lock requests were not blocked, the client could send a request to lock the file, the server could grant the request and send a reply to the client, and the server could then issue a revoke lock that referred to the lock just granted. If the revoke lock request in this case arrived at the client before the lock request reply, the client might not be able to correctly process the revoke, and furthermore, when the reply to the lock did arrive, the client might incorrectly assume that it had a lock on the file.

Referring again to FIG. 2, at 201 a test is performed to determine if there are any outstanding lock requests in process for the file. If there are, at 206 the request currently being processed is placed on a queue and at 207 is put in a sleep state to be awakened upon completion of outstanding requests. When this occurs, processing loops back to step 201. If there are no lock requests in progress for the file, processing continues at 202, wherein any any revoke lock request processing is blocked. This means that the current request will wait until any revoke lock requests that are currently being processed complete and, furthermore, prevents any revoke lock requests that have not yet begun from starting until later unblocked. At 203 it is determined if the data structures describing the lock information for this file (hereinafter referred to as the "lock table" for this file) are being held locally. At 204 processing continues if the lock table is local and the lock operation is performed on the local table. At 205 revoke lock request processing is unblocked.

When the lock table for the file is not local, processing continues at 212 where a lock request for this file is sent to the server. At 214 processing awaits the reply to the lock request. When the reply arrives processing continues at 215 wherein the reply is inspected. If the reply indicates that the process should try again later, processing continues at 216, wherein revoke lock request processing is unblocked. At 213 the process is put into a sleep state to be awakened upon the receipt of a retry message. Upon awakening, at 217 the revoke lock request processing is blocked and processing continues by looping back to 212.

If a reply to a lock request does not indicate that it is necessary to try again later the reply is inspected at 208. If the reply indicates that locks are to be kept locally at this client, processing continues at 209. At 209 a local lock table is created for this file. At 210 the original lock request is placed in the lock table. Placing a lock in the lock table at 204 may involve waiting until a blocking lock for this file is released by another process. However, placing a lock in the lock table at 210 will not involve waiting for a blocking lock since the table is a newly created, empty table. At 211 revoke lock request processing is unblocked, allowing revoke block processing to proceed now that the lock request is complete.

The following programming design language listing is another form of the description of the above processing that occurs at a client node when a process executing at that client attempts to perform a lock operation on a file. This listing parallels the operation described above for FIG. 2.

```
/* locking request by process running on client */
WHILE other lock requests are in progress for file Do
    queue this request on list of waiting lock
        requestors;
    sleep, awake on completion of a lock request;
ENDWHILE;
indicate that this request is in progress so that
    other requests will sleep;
block any new revoke_lock requests from starting to be
    processed;
IF revoke_lock request is in progress THEN
    wait until revoke is complete;
ENDIF;
IF lock table for file is local THEN
    perform lock operation;
    unblock revoke_lock request processing;
ELSE
    send lock request to server;
    await reply;
    WHILE reply says try again later DO
        unblock revoke_lock request processing;
        sleep, awake on retry message;
        block revoke_lock request processing;
        send lock request to server;
        await reply;
    ENDWHILE;
    IF reply says to begin keeping local locks THEN
        create lock table for the file;
        place lock in local table;
    ELSE
        /* reply will indicate the results of the */
        /* remote locking request */
    ENDIF;
ENDIF;
/* lock operation is complete, other lock requests for
    for the file can now proceed */
```

Figure 3:
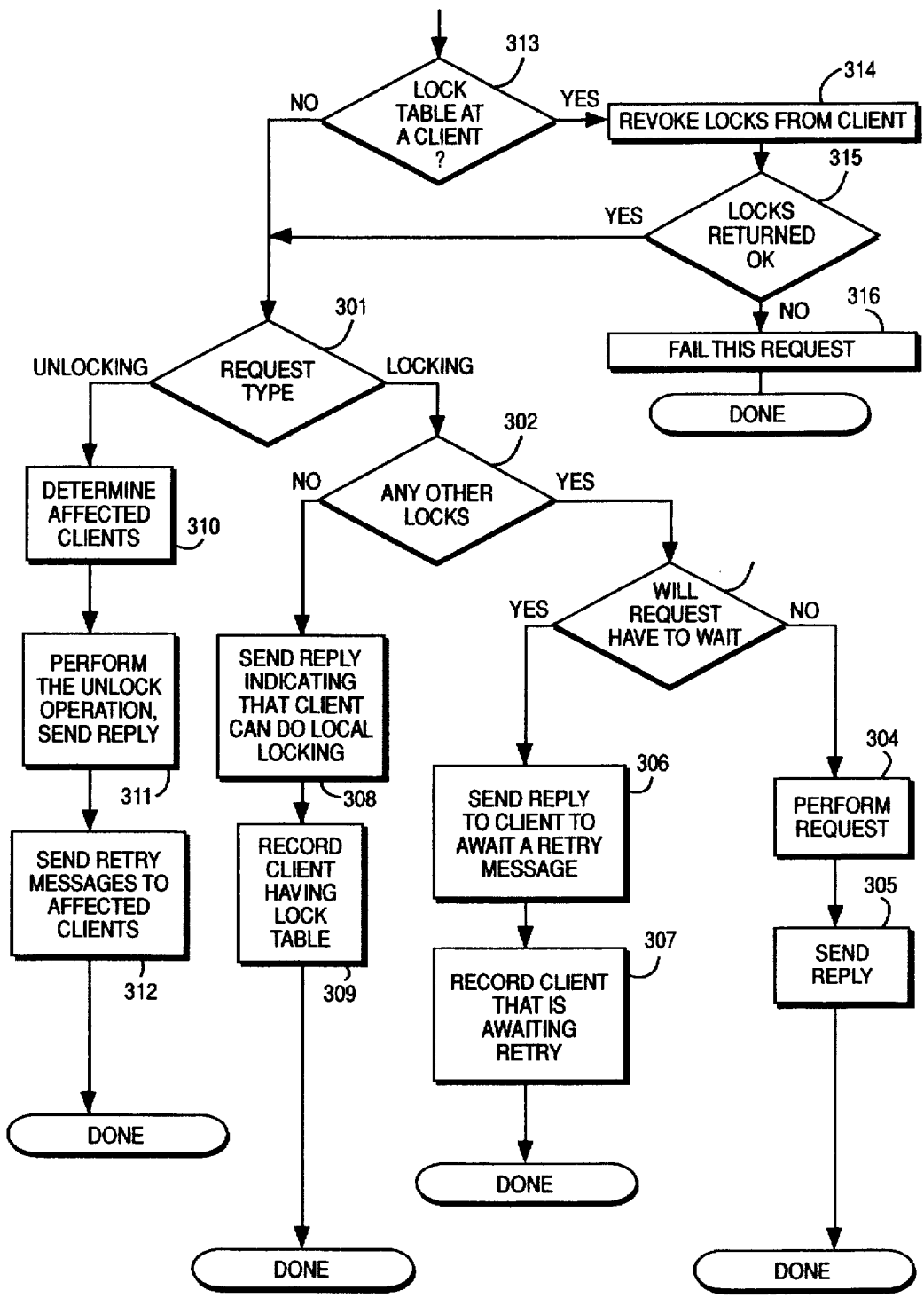
FIG. 3 is a flow chart which shows the operations performed at the server in response to a lock request.

FIG. 3 is a flow chart which shows the operations performed at the server in response to a lock request. Requests to unlock a file may trigger the transmission of retry notices to clients. Requests from a client to lock a file may cause the client to be informed that it can maintain the lock table locally or that it should sleep until it receives a retry message or that the lock operation has been performed. These cases are illustrated in the accompanying FIG. 3.

Assume for the purpose of illustration that client 10A is currently maintaining a lock table on a file stored at server 10C. If client 10B requests a lock on this file server 10C will send a revoke locks message to client 10A and will inform client 10A of the amount of space that server 10C has available in which to receive the lock table. If client 10A determines that its lock table is too large to be accommodated by this space, it returns an indication of this to server 10C. In this case server 10C sends a reply to client 10B that its lock request cannot be granted and has failed.

In FIG. 3, step 313 determines if the lock table is stored at a client. If it is, at 314 the server issues a revoke locks message to that client. At 315 if this lock table information is successfully returned, processing continues at 301. If the lock table is not successfully returned (because, for example, the size of the lock table exceeded the space available at the server for storing the lock table), at 316 the lock request is refused and the client is so informed.

Step 301 examines the type of request being performed. If the request is a request to unlock, processing continues at 310 wherein any clients that have previously been sent a reply to a lock request causing them to sleep awaiting a retry message and that have the possibility of having their original lock request granted after the unlock has been performed any clients are determined. At 311 the unlock operation is performed and a reply is sent to the requester indicating the outcome. At 312 retry messages are sent to all affected clients.

If the type of request is a request to lock, processing continues to step 302 wherein it is determined if there are any other locks currently on the file. If there are not, processing continues to 308 wherein a reply to the original lock request is sent indicating that the client can create a local lock table. At 309 a record is made of the client that will be maintaining the local lock table.

If it is determined that there are other locks on the file, processing continues to 303 wherein it is further determined if the request will entail waiting. If the request does interfere with previously established locks in a way that forces the request to wait, processing continues at 306 wherein a reply is sent, indicating that the requesting process at the client should be put in a sleep state awaiting a retry message. A record is made in the lock table, associated with the lock causing interference, of the client that is awaiting a retry message.

If the request can be performed without the need to wait, processing continues at 304 wherein the request is performed. At 305 a reply is sent to the client indicating the outcome of the request.

The following programming design language listing is another form of the description of the above operations performed at the server in response to a lock request. This listing parallels the operation described above for FIG. 3.

```
/* server processing of a lock request */
IF lock table for file is currently at a client THEN
    send revoke lock request to client that has lock
        table;
    await reply;
    IF lock list cannot be returned THEN
        send reply to lock request indicating that
            the request failed;
        RETURN;
    ENDIF;
ENDIF;
IF request is a locking request THEN
    IF the lock table has at least one entry THEN
        IF the request is blocked by a lock already
            in the table THEN
            send reply to client that it will
                have to sleep awaiting a retry
                notification;
            add client to lock table list of
                clients that are awaiting retries;
        ELSE
            /* the request isn't blocked */
            perform the request;
            send reply to client;
        ENDIF;
    ELSE
        /* there are no locks on the file yet */
        send a reply to client that it should
            maintain the lock list;
            record that this client has the lock table;
            /* for use in future revokes */
    ENDIF;
ELSE
    /* request is an unlocking request */
    determine affected clients by scanning lists of
        clients needing retries in lock table;
    perform the unlock operation;
    send reply to requestor of unlock;
    send retry messages to each of the affected
        clients;
ENDIF;
```

Figure 4:
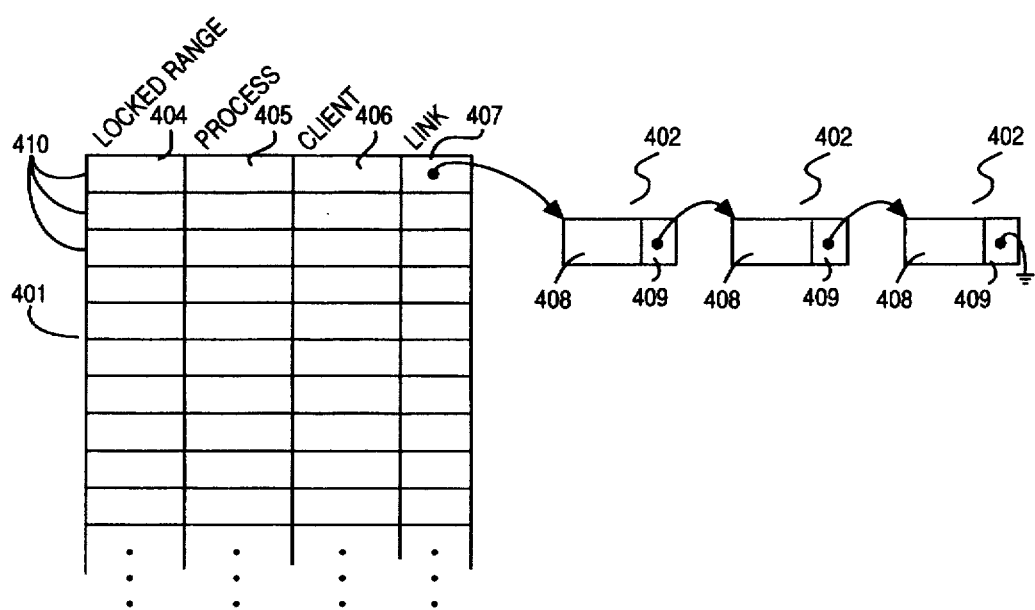
FIG. 4 shows the structure of a files lock table.

FIG. 4 shows the structure of a files lock table 401. The table comprises individual entries 410. Each entry 401 has four fields 404–407. Entry 404 describes the range and type of lock. The range represents a range of bytes in the file that have been locked for shared use or exclusive use depending on the type of lock indicated in this field. Entry 405 identifies the process that has the file lock, and entry 406 identifies the client node on which this process is running. Entry 407 is a link field containing a pointer to a list of elements 402. Each element contains a field 409 with a link to the next or a value indicating the end of the list. Field 408 of each element identifies a client that has been sent a reply to a lock request indicating that the requesting process should sleep until sent a retry message. When a lock is unlocked, the list of elements is traversed and retry notices are sent to each of the clients.

In summary, a distributed data processing system and method are disclosed in which locks on a file are supported by a data structure that resides on either a client machine or on the file's server. When only a single client's processes are locking a file, the data structure can reside on that client. Whenever a plurality of client machines attempt to place locks on a file, the data structure is moved to the server; this forces the clients locking the file to communicate with the server when performing lock operations. When a client requests a lock from the server that cannot be granted because of an existing blocking lock, the client is informed that it should put the requesting process asleep awaiting a retry notification. When there is a change in the locks on the file that might allow such a client's now sleeping process to acquire the lock, the server sends a retry notice to the client. This awakens the sleeping process at the client, and the process then reattempts the lock operation by sending a message to the server.

While the invention has been shown and described with reference to particular embodiments thereof, it will be understood by those skilled in the art that the foregoing and other changes in form and details may be made therein without departing from the spirit and scope of the invention.

We claim:

1. In a distributed data processing system in which at least one client machine has access to a file stored at a server of said distributed data processing system, a computer storage containing a program for access by a data processing system for locking a first portion of said file stored at said server of said distributed data processing system, said computer program comprising:

first data structure instruction means accessible by said data processing system for receiving, at said server, a request by one client machine to lock said first portion of said file;

second data structure instruction means accessible by said data processing system, and responsive to said first data structure instruction means, for detecting, at said server, whether any other client machine has locked any portion of said file;

third data structure instruction means accessible by said data processing system, and connected to said second data structure instruction means, for replying to said one client machine that said one client machine can maintain a lock on said first portion of said file locally while no other client machine attempts to lock any portion of said file; and fourth data structure instruction means accessible by said data processing system, and responsive to said third data structure instruction means, for establishing, at said one client machine, a data structure describing said lock in response to said third data structure instruction means that said one client machine can maintain said lock locally.

2. The computer storage containing a program of claim 1 further comprising:

fifth data structure instruction means accessible by said data processing system, and responsive to said third data structure instruction means, for notifying said one client machine that said one client machine must transfer said data structure describing said lock from said one client machine to said server in response to a detection of a request to said server by another client machine attempting to lock said any portion of said file.

3. The computer storage containing a program of claim 2, wherein said fourth data structure instruction means further comprises:

sixth data structure instruction means accessible by said data processing system, and responsive to said fifth data structure instruction means, for determining an amount of space required at said one client machine for storage of said data structure describing said lock.

4. The computer storage containing a program of claim 3, wherein said fifth data structure instruction means further comprises:

seventh data structure instruction means accessible by said data processing system, and responsive to said sixth data structure instruction means, for further determining if said amount of space required at said one client machine for storage of said data structure describing said lock is available at said server following said request by another client machine attempting to lock said any portion of said file.

5. The computer storage containing a program of claim 4, wherein said seventh data structure instruction means further comprises:

eighth data structure instruction means accessible by said data processing system, and responsive to said seventh data structure instruction means, for transferring said data structure describing said lock from said one client machine to said server if said amount of space required at said one client machine for storage of said data structure describing said lock is available at said server.

6. The computer storage containing a program of claim 5, wherein said seventh data structure instruction means further comprises:

ninth data structure instruction means accessible by said data processing system, and responsive to said seventh data structure instruction means, for notifying said another client machine that said attempt to lock said any portion of said file by said another client machine is presently impossible if said amount of space required at said one of said client machines for storage of said data structure describing said lock is unavailable at said server.

7. In a system for locking a file stored at a server of a distributed data processing system in which at least one client machine has access to said file, a computer storage containing a program for access by a data processing system, comprising:

first data structure instruction means accessible by said data processing system for attempting by a first client machine to lock a portion of said file, the first client machine sending the request in response to a request by a process at said first client machine for locking a portion of said file;

second instruction means accessible by said data processing system, and responsive to said first data structure instruction means, for detecting, at said server, whether any other client machine has locked said portion of said file;

third data structure instruction means accessible by said data processing system, and responsive to said first data structure instruction means, for detecting, at said server, whether any other client machine has unlocked said portion of said file;

fourth data structure instruction means accessible by said data processing system, and connected to said second data structure instruction means, for notifying, by said server, said first client machine to put to sleep said first data structure instruction means at said first client machine in response to said second data structure instruction means, that any other client machine has locked said portion of said file; and fifth data structure instruction means accessible by said data processing system, and connected to said third data structure instruction means, for notifying, by said server, said first client machine to awaken said first data structure instruction means in response to said third data structure instruction means, that said any other client machine has unlocked said portion of said file.

\* \* \* \* \*